United States Patent
Delaney et al.

(10) Patent No.: US 6,805,333 B2
(45) Date of Patent: Oct. 19, 2004

(54) CABLE LASHER

(75) Inventors: Kevin J. Delaney, Bristol, PA (US); David Haskell, Delran, NJ (US); Layne Blavier, Willow Grove, PA (US)

(73) Assignee: General Machine Products Co., Inc., Trevose, PA (US)

( * ) Notice: Subject to any disclaimer, the term of this patent is extended or adjusted under 35 U.S.C. 154(b) by 0 days.

(21) Appl. No.: 10/115,877

(22) Filed: Apr. 4, 2002

(65) Prior Publication Data

US 2003/0189195 A1 Oct. 9, 2003

(51) Int. Cl.⁷ .............................................. F21C 29/16
(52) U.S. Cl. ........................................... 254/134.3 CL
(58) Field of Search .............................. 254/134.3 CL, 254/134.3 R

(56) References Cited

U.S. PATENT DOCUMENTS

| | | | |
|---|---|---|---|
| 2,402,172 A | * | 6/1946 | Macy ................. 254/134.3 CL |
| 2,663,544 A | | 12/1953 | Harley |
| 2,668,688 A | | 2/1954 | Stanford |
| 2,895,713 A | * | 7/1959 | Richardson ........ 254/134.3 CL |
| 3,185,443 A | * | 5/1965 | Eitel ................. 254/134.3 CL |
| 3,482,818 A | | 12/1969 | Neale, Sr. |
| 4,311,299 A | * | 1/1982 | Elliott, Jr. .......... 254/134.3 CL |
| 4,424,954 A | | 1/1984 | Innes |
| D277,009 S | | 1/1985 | Schweyher |
| 4,569,219 A | * | 2/1986 | Threlkel et al. ............... 72/381 |
| 6,062,542 A | | 5/2000 | Delaney et al. |
| 6,398,189 B1 | | 6/2002 | Delaney et al. |

OTHER PUBLICATIONS

General Machine Products Catalog, p. 4, entitled "Lashing General Information".

"New Apollo Lasher Makes Parallel–Pull Lashing Faster, Easier", P.C.C.A. Reporter, Apr. 1997.

* cited by examiner

Primary Examiner—Robert C. Watson
(74) Attorney, Agent, or Firm—Donald R. Piper, Jr.; Dann, Dorfman, Herrell & Skillman, P.C.

(57) ABSTRACT

A cable lasher is provided for securing a utility cable, such as a telephone or transmission cable, to a support strand strung in the air between adjacent utility poles. The lasher is pulled forwardly along the support strand and releases lashing wire from a drum at the rear of the lasher. The lasher has a pair of drive wheels that rotate on the support strand. The drive wheels translate linear motion of the lasher into rotational motion of the drum as the lasher moves forwardly. Lashing wire is released from the rotating drum and helically wrapped around the cable and the strand. Tension in the lashed wire is maintained by an adjustable latch assembly which prevents the lasher from moving rearwardly to unwind the wire.

22 Claims, 10 Drawing Sheets

CABLE LASHER

FIELD OF THE INVENTION

The present invention relates to an apparatus for lashing utility cables to a support strand, and more specifically to a cable lasher that can be used in lashing a cable to a bare support strand or a support strand lashed to other cable.

BACKGROUND

Utility cables, such as telephone cables, are frequently routed by connecting the cables to overhead support wiring, or support strands, that are suspended from a series of utility poles. In an effort to prevent the telephone cable from sagging between adjacent poles, the cable is frequently tied or "lashed" to a support strand that is tightly strung between the poles. For this purpose, a conventional lasher is pulled along the support strand to lash the cable to the strand. Before a lasher is used, the cable is loosely supported by temporary support brackets hung from the support strand. The lasher is then mounted on the support strand in position to engage the loosely supported cable. One or more coils of lashing wire are loaded onto the lasher, and a free end of lashing wire is clamped to the strand or otherwise secured at a starting point. The lasher is then pulled along the support strand. The loosely suspended cable slips through the front end of the lasher as the lasher moves along the strand. As the lasher is pulled along the strand, the lashing wire is helically wrapped around the cable and the strand to bind the cable to the strand. Reverse movement of the lasher is typically limited to minimize unwinding and loss of tension of the helically lashed wire.

The lasher rides along the top side of the strand and typically lashes the cable to the underside of the strand. When a strand is lashed to a cable for the first time, a locking bar on the lasher may be locked across the underside of the strand to hold the lasher securely on the top of the strand. When cable is being "overlashed", that is, when cable is lashed to a strand that is already lashed to another utility line or cable, the lasher must ride over both the strand and the other utility line. In such an arrangement, the locking bar cannot be used. Typically, the locking bar is designed to lock around the relatively small diameter of the strand, and therefore does not have adequate clearance to lock around both a strand and a utility line already lashed to the strand. Therefore, it would be desirable for the locking bar to be repositioned and secured outside the path of the strand and the previously lashed cable when overlashing is performed. It would also be desirable to provide a suitable support structure on the frame to ensure that the cable is fed into the frame of the lasher as smoothly as possible.

SUMMARY OF THE INVENTION

In light of the foregoing, the present invention provides a cable lasher for securing telephone and transmission cables to a support strand strung in the air between utility poles. The cable lasher is operable to lash cable to a bare support strand, or to overlash cable onto a previously lashed support strand and cable.

In general, the cable lasher is movable along the support strand so that the transmission cable is fed through the lasher. The lasher includes a hollowed support frame having a central longitudinal channel or passageway for receiving the cable. The channel may extend the length of the lasher. A rotating drum is mounted relative to the frame and has an opening that aligns with the channel in the frame. As the lasher is moved forwardly along the support strand, a gearbox translates linear movement of the lasher along the support strand into rotational movement of the drum. For example, the support strand may contact and drive one or more drive wheels which in turn drive the gearbox. In operation, the gearbox causes the drum to rotate about the cable as the cable lasher rides on the support strand.

The rotating drum may contain at least one coil of lashing wire for lashing the cable to the support strand. Lashing wire is fed from the coil and through a series of pulleys or guides before being wrapped around the strand and cable. In use, the lasher is mounted on a support strand in position to receive a loosely supported cable. The free end of the lashing wire is then tied off on or near the strand prior to operation of the lasher. As the lasher begins to move along the strand, the drum starts to rotate about the cable and the strand creating tension in the wire. Then, wire is pulled from the coil and helically wraps around the cable and the support strand, lashing the two together.

In operation, the cable lasher is clamped over the support strand so that the cable is fed through the hollow channel in the lasher. The lasher is pulled from the ground by a worker using a handline, or by a line connected to a moving vehicle or capstan winch. As the lasher rides on the support strand, the drive wheel assembly causes the drum to rotate. In a specific arrangement, a drive wheel may be mounted on a common axle with a respective bevel gear of the gearbox to effect the translation of linear motion of the lasher into rotational motion of the bevel gear. Multiple drive wheels may be utilized. The bevel gear further translates torque to other gears of the gearbox to rotationally propel the drum. As the drum rotates, lashing wire from the coil is helically wrapped around the cable and the support strand, thereby lashing the cable and strand together.

The drive wheel assembly and gear box operate during normal use to limit the rotational motion of the drum in a single rotational direction only. As the lasher rides along the strand, a latch mechanism prevents reverse rotation of the drum. For this purpose, the latch mechanism may include a one-way latch which functions to engage a brake gear integrally mounted with the bevel gear to restrict the bevel gear from rotating in a reverse direction. For example, the latch may include a latch pawl for engaging sprocket grooves on the brake gear to prevent reverse rotation of the bevel gear and, as a result, the drum. As such, the one-way latch restricts the drum from rotating in the reverse direction. The one-way latch also restricts the drive wheel from rotating in a reverse direction, limiting reverse movement of the lasher on the support strand. This arrangement maintains tension in the lashing wire to provide a consistently tight wind and prevent unwinding of the lashing wire. A user-operated release may be actuated at any time to disengage the one-way latch from the brake gear to permit reverse movement of the lasher on the strand and reverse the rotation of the drum. If reverse rotation of the drum is needed, or if reverse motion of the lasher on the strand is required, the user-operated release can be used to disengage the one-way latch from the brake gear of the gearbox. When the one-way latch is disengaged from the brake gear, the drum is free to rotate in either direction, and the lasher is free to move along the strand in either direction.

The one-way latch may include an adjustment mechanism to control the amount of engagement between the latch and the brake gear. For this purpose, the latch arm or pawl may be connected to a linkage that shifts or reciprocates laterally as the latch pawl is moved into and out of the brake gear sprocket grooves or teeth. The range of lateral motion of the linkage controls the depth at which the latch fits between the sprocket teeth. This range of motion in the linkage may be adjusted by use of an eccentric screw disposed through a bore in the linkage. As the concentric screw is turned, a lateral shift will be effected between the linkage and the pawl.

A front gate assembly may be mounted on the front end of the cable lasher for lifting the loosely hung cable into position for lashing with the strand. The front gate assembly may be swung open and closed to allow the lasher to be placed over a section of the strand and cable so that the strand and cable are received into the channel. The front gate assembly includes a roller that lifts the cable as the cable is fed into the lasher. The roller provides a smooth surface for supporting the cable so that the cable may be fed into the lasher without encountering sharp edges that could pinch the cable or generate a large amount of friction. The cable may shift laterally as it enters the channel of the lasher. Therefore, the roller may span generally the entire width of the channel. In a specific arrangement, the roller may have a width generally equal to the entire width of the channel to maximize rolling contact with the cable over the largest range of lateral displacement as the cable enters the channel. The front gate assembly may also include a front support bar that supports sagging cable being fed into the lasher. The front support bar has a rounded mouth edge upon which sagging cable may rest so that a sagging cable being fed into the lasher may be supported without encountering sharp edges.

A tapered front cover or cowl may be provided on the front end of the lasher to function as a nose cone to prevent objects from catching on the cable lasher as it rides along the support strand. The tapered front cowl covers the front end of the lasher and has a narrow front portion and a wider tail portion having an outer diameter that is slightly larger than the outer diameter of the rotatable drum. The tapered shape of the front cowl prevents objects from catching on the rotating drum as the cable lasher rides along the support strand.

A support strand lock may also be provided toward the front end of the lasher to secure the lasher about the support strand while still allowing the lasher to slide along the strand. For this purpose, the strand lock may include a generally horizontal locking bar that can be rotated about a pivot between an open position oriented generally longitudinal to the channel and the support strand to permit the device to be mounted upon the strand and a closed position generally transverse to the channel and the strand to permit the lasher to be secured onto the strand. The locking bar may also be movable between a raised engaged position and a lowered disengaged position by a lever handle. The bar can also be raised, or pulled inwardly into the frame, into contact with the underside of the support strand to maintain the strand in contact with the drive wheel of the lasher. Alternatively, the bar may be moved into a lowered position, outwardly from the frame and out of contact with the strand. In the lowered position, the locking bar may be pivoted between its closed orientation, in which the locking bar is generally perpendicular to the support strand and channel, and its open orientation, in which the locking bar is rotated out of the channel to an orientation generally parallel to the support strand. In the closed orientation, the locking bar can be raised by the lever handle to engage the strand. A first bracket mounted at the side of the channel opposite the pivot for the bar receives and captures the free end of the locking bar when the bar is raised so that the locking bar is restricted from pivoting out of engagement with the strand. In the open orientation, the locking bar can be raised by the lever handle to move the free end of the bar into a second bracket mounted on the same side of the channel as the pivot. Once in the second bracket, the locking bar is secured away from the channel so that the frame can be mounted over a strand and cable without interference from the locking bar.

DESCRIPTION OF THE DRAWINGS

The foregoing summary as well as the following description will be better understood when read in conjunction with the Figures in which.

DESCRIPTION OF THE PREFERRED EMBODIMENT

Figure 1:
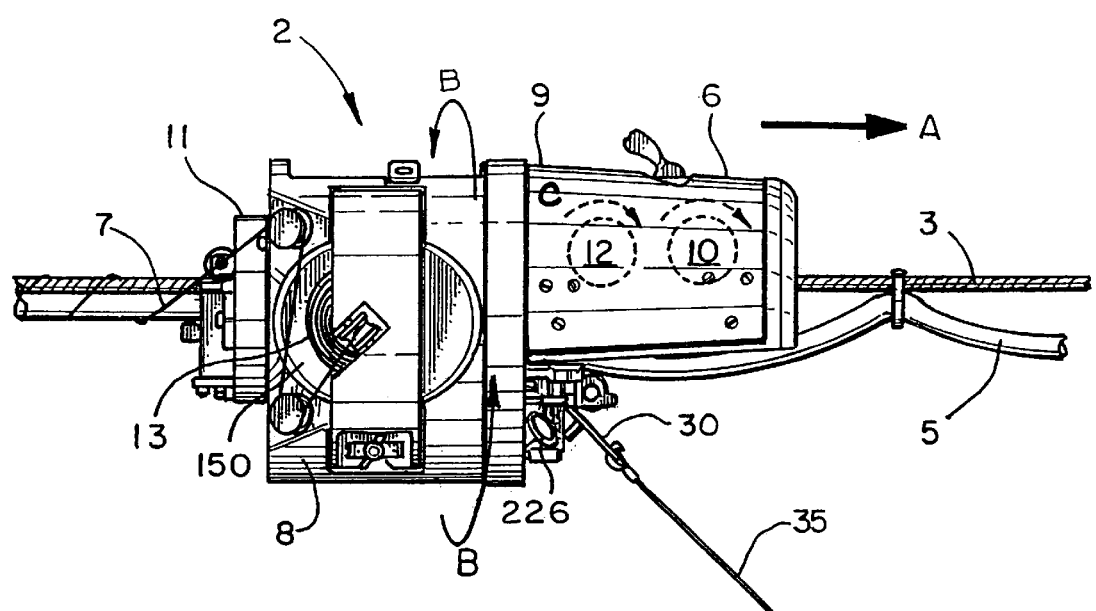
FIG. 1 is a side elevation view of a cable lasher in accordance with the present invention, illustrating the cable lasher in operation to lash a utility cable to a support strand.
Figure 2:
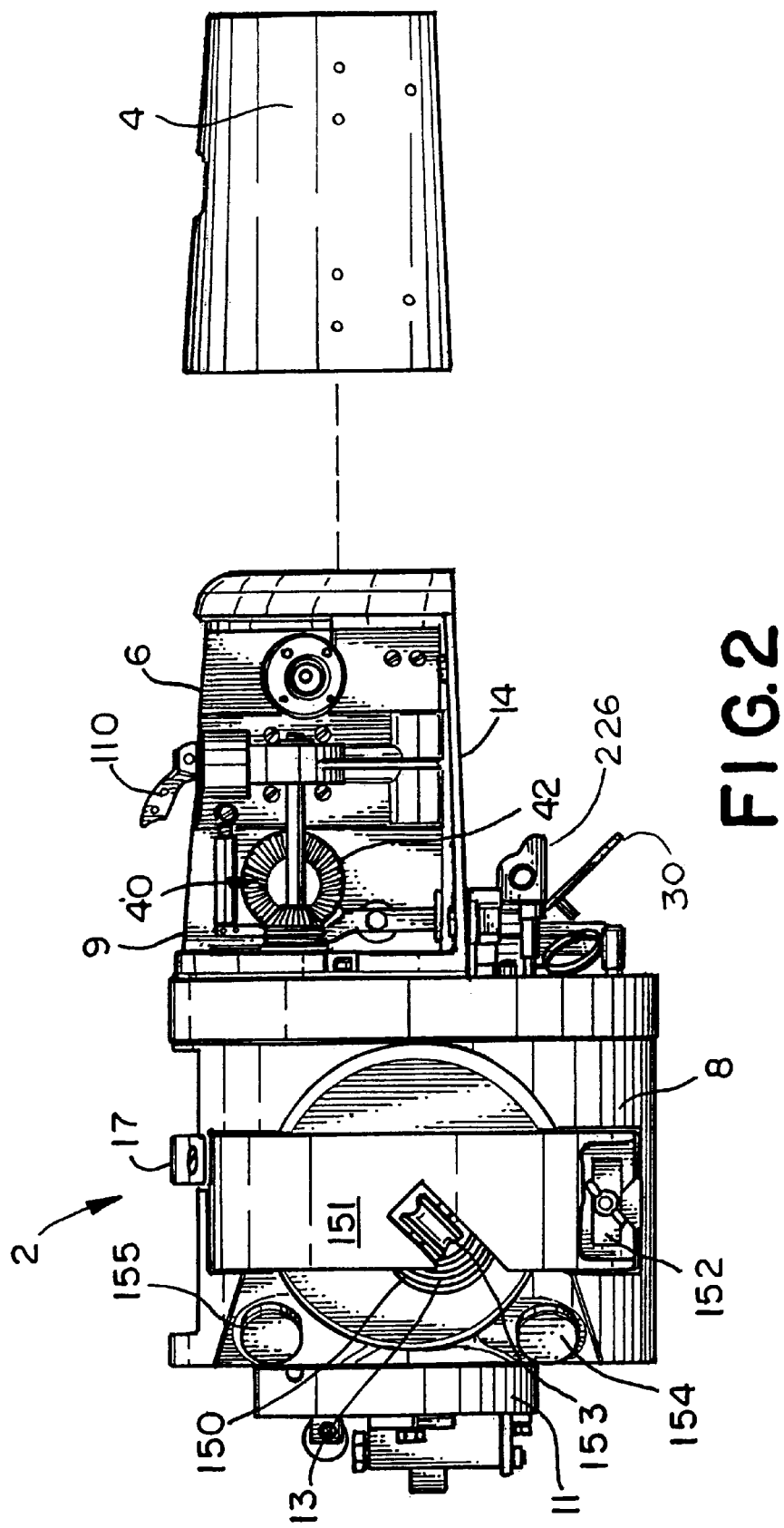
FIG. 2 is an exploded right side elevation view of the cable lasher of FIG. 1 with the cover removed, showing components in the front gear train section.

Referring to FIGS. 1–16 in general, and to FIGS. 1–2 specifically, a cable lasher is shown and designated generally as 2. The cable lasher 2 is configured to ride on a support strand 3 strung in the air between two utility poles or other supporting structures for the purpose of securing a telephone or transmission cable 5 to the support strand. As the lasher 2 moves along the strand 3, the lasher wraps a lashing wire around the cable and the strand to tie the cable to the strand.

Prior to operation of the lasher, a support strand 3 is tightly strung in the air between utility poles. The cable 5 is temporarily suspended from the strand 3 by a series of clamps or other form of temporary support, as shown in FIG. 1. Lashing wire 7 is loaded on the lasher 2, and the lasher 2 is releasably clamped onto the support strand 3 such that the lasher straddles above the strand and cable 5. Once in place, the lasher 2 is pulled forwardly along the strand 3. As the lasher 2 rides on the strand 3, lashing wire 7 is helically wrapped, or tightly lashed, around the cable 5 and the support strand, tying the cable and strand together.

Referring now to FIGS. 1–4, the cable lasher 2 will be described in more detail. The lasher 2 comprises a hollow frame 9 having a forward or front drive train section 6 and a rear section 11. A tapered cover or cowl 4 is disposed over the front of the frame 9 to protect internal parts in the front drive train section 6. The frame 9 forms a central passageway 14 in the form of an inverted channel passageway on the underside of the lasher that extends along the entire length of the frame. The central channel or passageway 14 receives the strand 3 and cable 5 when the lasher is clamped over the strand so that the strand tracks generally through the center of the lasher as the lasher is pulled along the strand. The rear section 11 includes a rotating drum 8 that rotates about the support strand 3 and cable 5 as the frame 9 is pulled forwardly along the strand. The direction of forward movement A and drum rotation B are represented schematically in FIG. 1. In particular, the direction of forward movement on the lasher 2 is represented by the horizontal arrow marked "A" in FIG. 1. The direction of rotation of the drum 8 during forward movement of the lasher 2 is represented by the curved arrows marked "B" in FIG. 1. The drum 8 has a narrow opening slot that may be rotatably aligned within the central channel 14 on the frame 9 to permit insertion of the cable and strand into the drum 8. A handle bar 17 is mounted to the drum 8 to facilitate carrying of the lasher 2 by hand. The handle bar 17 may be used to manually lift the lasher 2 off of the strand 3 after it reaches a utility pole at the end of the strand. Once lifted, the handle bar 17 may be used to carry the lasher around the utility pole for placement onto a strand on the other side of the pole. The exterior of the rear drum 8 is configured to dispense lashing wire 7 as the lasher 2 is moved along the strand 3. As such, the rear drum 8 is operable to rotate as the lasher frame 9 is moved along the strand 3 in order to wrap lashing wire 7 in a tight helical pattern around the cable and the strand, as shown in FIG. 1.

Figure 5:
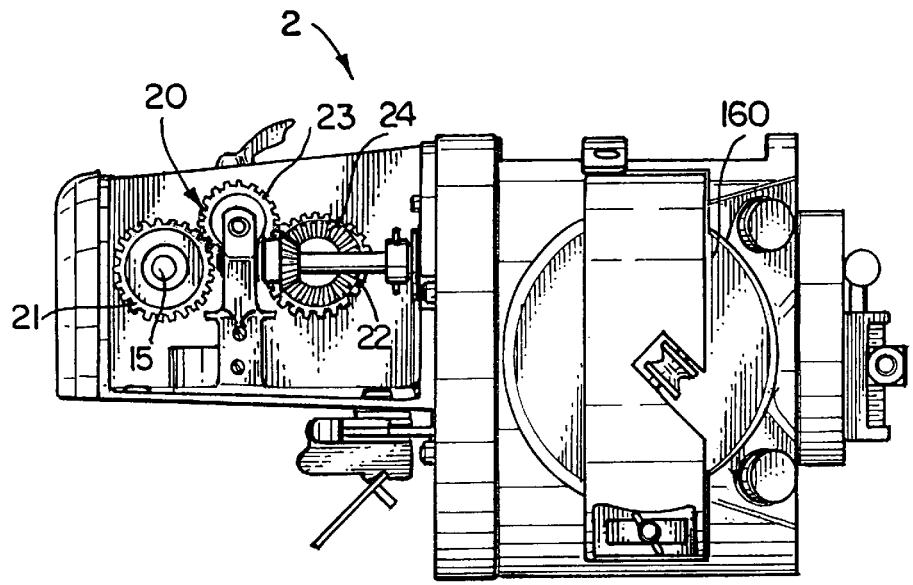
FIG. 5 is a left side elevation view of the cable lasher of FIG. 1 with the cover removed.

Referring now to FIGS. 1, 2 and 5, the exterior of the drum 8 includes a pair of cylindrical compartments 150, 160 on opposite sides of the drum for storing and dispensing lashing wire 7. The compartments 150, 160 are each adapted to house a respective coil 13 of lashing wire 7. The lasher 2 is operable to release wire from one or both compartments 150, 160 to lash the cable 5 to the strand 3. When both coils 13 are used simultaneously, a double lash is effected. The compartments 150, 160 and their respective components are generally identical and are located in a mirrored arrangement on the exterior of the drum 8. For purposes of this description, only one compartment 150 and its respective components will be described. The compartment 150 includes a hinged door 151 that swings to an open position to facilitate loading or unloading of a wire coil 13. The door 151 also swings to a closed position to secure a wire coil 13 in the compartment 150. The door 151 cooperates with a locking mechanism 152 to secure the door in its closed position. The locking mechanism may comprise any suitable locking component, such as a threaded bolt and wing nut, as shown in FIG. 2. A dispensing pulley 153 is rotatably mounted on an axle in the door 151 and is generally oriented at a 45° angle relative to the longitudinal axis of the lasher. The dispensing pulley 153 is configured to dispense wire from the coil 13 toward a first snubbing pulley 154 mounted on a rear section of the drum 8. The first snubbing pulley 154 is configured to receive lashing wire from the dispensing pulley 153 and direct it to a second snubbing pulley 155 mounted on the rearward end of the drum 8. The second snubbing pulley 155 is configured to receive lashing wire 7 from the first snubbing pulley 154 and release the wire to the strand 3 and cable 5. The lasher 2 and drum 8 are operable to generate and maintain tension in the lashing wire as the lasher moves forwardly on the strand 3. As such, lashing wire 7 is pulled from the coils 13 in response to forward motion of the lasher. The snubbing pulleys 154, 155 are configured to maintain tension in the wire 7 as the lasher 2 is pulled or when the lasher is left in a stationary position on the strand 3.

Figure 3:
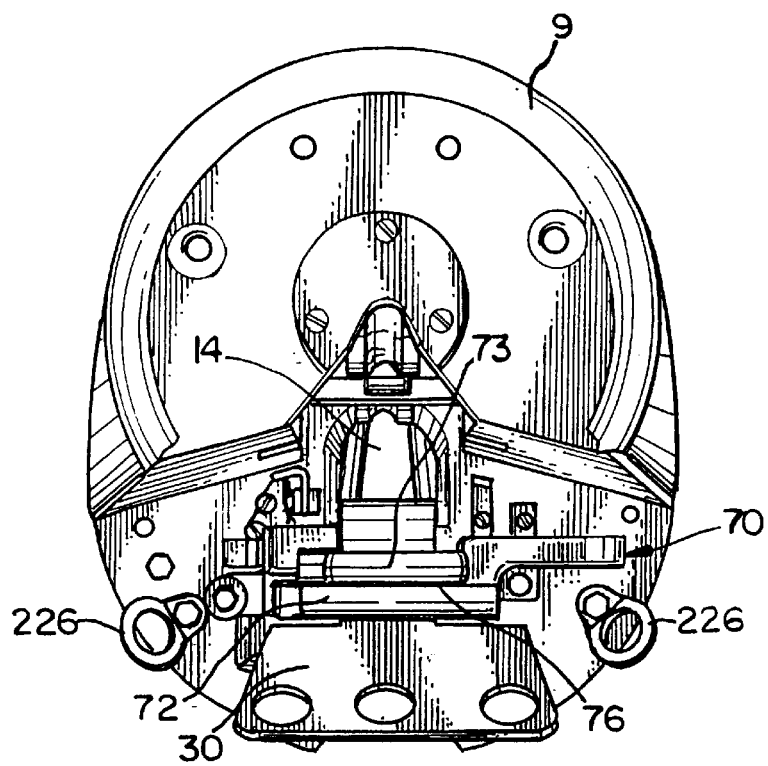
FIG. 3 is a front elevation view of the cable lasher of FIG. 1.
Figure 4:
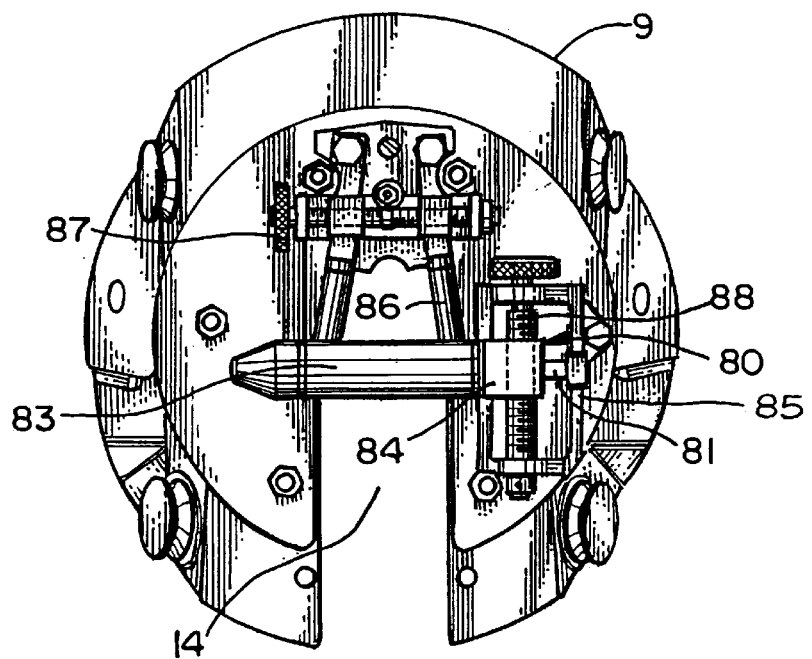
FIG. 4 is a rear elevation view of the cable lasher of FIG. 1.

Referring now to FIGS. 3–4, the lasher 2 has a front gate assembly 70 and a rear gate assembly 80 that open and close to permit the frame 9 to be mounted over and removed from a strand 3 and a cable 5. The front gate assembly 70 is mounted on a hinge on the front face of the frame 9 and includes a roller bar 73 for supporting the underside of a cable 5 when the frame 9 is mounted over the cable. The front gate 70 is configured to pivot on the hinge between an open position and a closed position. In the open position, the front gate 70 is pivoted out of the central channel 14 to allow the frame 9 to be placed over the strand 3 and cable 5 in a straddling position. In the closed position, the front gate 70 crosses the central channel 14 and releasably latches to the front face of the frame 9 so as to capture the strand 3 and the cable 5 during operation of the lasher 2.

During lashing, the loosely suspended cable 5 must be lifted into contact with the strand 3 and supported in that position. Preferably, the components used to lift and support the cable 5 are free of sharp edges that can pinch the cable or cause excessive friction between the cable and the lifting mechanism. Referring to FIG. 3, the front gate assembly 70 includes a roller bar 73 that supports the underside of the cable 5 as it moves through the channel 14 in the frame 9. The roller bar 73 is mounted generally perpendicular to the longitudinal axis of the frame 9 and has a width that spans the full width of the channel 14. The width of the roller bar 73 is extended for the full width of the channel 14 to account for any lateral shifting of the cable and to maximize the surface contact between the cable 5 and the roller bar 73 as the cable slides through the channel. The front gate assembly 70 also includes a rounded support bar 72. The rounded support bar 72 is positioned lower than the roller bar 73 and therefore does not contact the cable in most situations. In some situations, however, the cable 5 may sag or otherwise droop significantly below the roller bar 73 so as to contact the support bar 72. In such cases, the support bar 72 provides additional support for the cable. The support bar 72 has a rounded upper edge 76 that slidably engages the underside of the cable 5.

Like the front gate assembly, the rear gate assembly 80 is moveable between an open position and a closed position to enable the lasher 2 to be mounted onto and then retained on the strand 3. The rear gate includes a roller bar 83 that is oriented generally horizontally for supporting the underside of the cable 5 as the cable exits the lasher. The roller bar 83 is configured to pivot on a hinge between an open position and a closed position. In the open position, the roller bar 83 is pivoted out of the central channel 14 to allow the frame 9 to be placed over the strand 3 and cable 5 in a straddling position. In the closed position, the roller bar 83 crosses the central channel 14 so as to enclose and capture the strand 3 and the cable 5 within the lasher 2. A spring loaded thumb latch 81 is operable to pivot the roller bar 83 between the open and closed positions. In particular, the thumb latch 81 is configured to abut the hinge in the closed position to restrict the roller bar 83 from pivoting to the open position. The thumb latch 81 contains an internal compression spring that biases the thumb latch outwardly from the roller bar 83 along the longitudinal axis of the roller bar such that the latch abuts the hinge support 85. The thumb latch 81 may be depressed against the bias of the spring to permit the latch to clear the hinge support 85 and enable rotation of the roller bar 83 to the open position.

The roller bar 83 may be rotated to the closed position. The vertical position of the roller bar 83 is adjustable to accommodate cables of different diameters. In particular, the roller bar 83 is mounted on a support block 84 that may be raised or lowered on a threaded rod 88. The support block 84 has a threaded bore adapted to receive and engage threads on the threaded rod 88. The threaded rod 88 is rotatable to raise the support block 84 and roller bar 83 to maintain the cable 5 in close proximity to the strand 3 as the cable and strand exit the central channel 14. The rear gate assembly 80 also includes a pair of guide rollers 86 that project downwardly on opposing sides of the channel and operate with the roller bar 83 to hold the strand 3 and cable 5 in close engagement prior to lashing. The guide rollers 86 are mounted on an adjustment bolt 87 to adjust the lateral spacing between the guide rollers to deter lateral shifting of the strand and cable as they exit the lasher. The adjustment bolt 87 includes standard threading on one half of the bolt and a reverse threading on the other half of the bolt. Each guide roller 86 is mounted on a support having a threaded bore that cooperates with one of the threaded areas on the adjustment bolt. The guide rollers 86 and adjustment bolt 87 are configured such that the rotation of the adjustment bolt changes the spacing between the guide rollers. In particular, the guide rollers 86 converge or move toward one another in the lateral direction in response to clockwise rotation of the adjustment bolt 87, and diverge or move away from one another in response to counterclockwise rotation of the adjustment bolt. As such, the guide rollers 86 are adjustable to accommodate strands and cable of varying diameters.

Referring to FIGS. 1 and 3, the lasher 2 is configured to be pulled by a worker using a handline or bridle 35, or with the assistance of a vehicle, a capstan winch, or other pulling mechanism located below the strand 3. A pull handle 30 and a pair of eye loops or guide handles 226 are connected to the lower front end of the frame 9 and are adapted to permit one or more bridles 35 to be secured to the frame. The lasher 2 is towed in a forward direction to lash the cable 5 to the support strand 3. Movement of the lasher 2 on the strand 3 in the reverse or rearward direction is restricted during normal operation, as will be described in more detail below.

Figure 6:
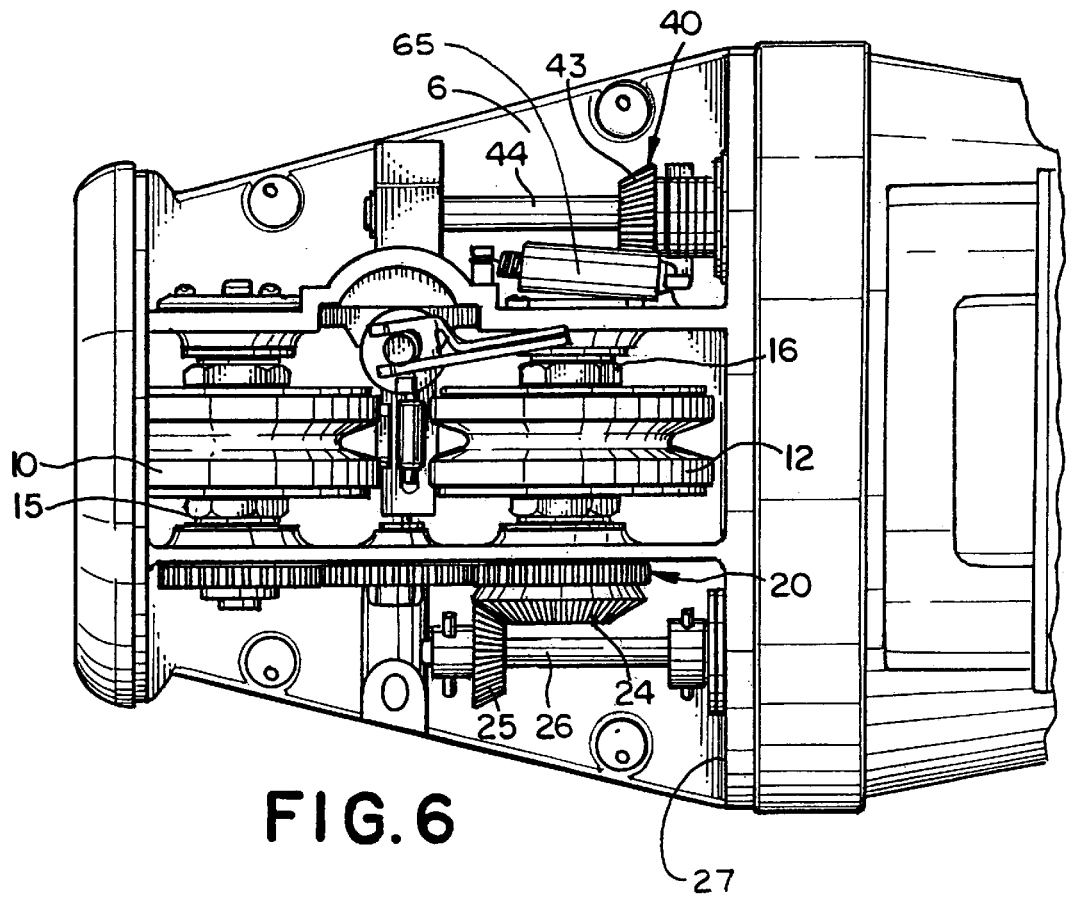
FIG. 6 is an enlarged fragmented top plan view of the cable lasher of FIG. 1 with the cover removed, showing the components of the front gear train section.

Referring now to FIG. 6, the front gear train section 6 comprises a front drive wheel 10 and a rear drive wheel 12 that ride along the top of the support strand 3 during operation of the lasher 2. The weight of the lasher 2, plus the downward force applied to the tow bridle 35, causes the drive wheels to frictionally engage the strand 3, such that the drive wheels rotate as the lasher is pulled along the strand. In FIG. 1, the drive wheels 10, 12 are represented schematically by dashed lines inside the front gear train section 6. The direction of rotation of the drive wheels 10, 12 during forward movement of the lasher 2 is represented by the dashed arrows marked "C". The drive wheels 10, 12 are cooperatively engaged with a gear assembly to translate linear motion of the frame 9 to rotational motion of the rear drum 8. The rear drum 8 is configured to rotate about the strand and cable in response to forward motion of the drive wheels 10, 12, releasing lashing wire 7 in a helical pattern.

Figure 7:
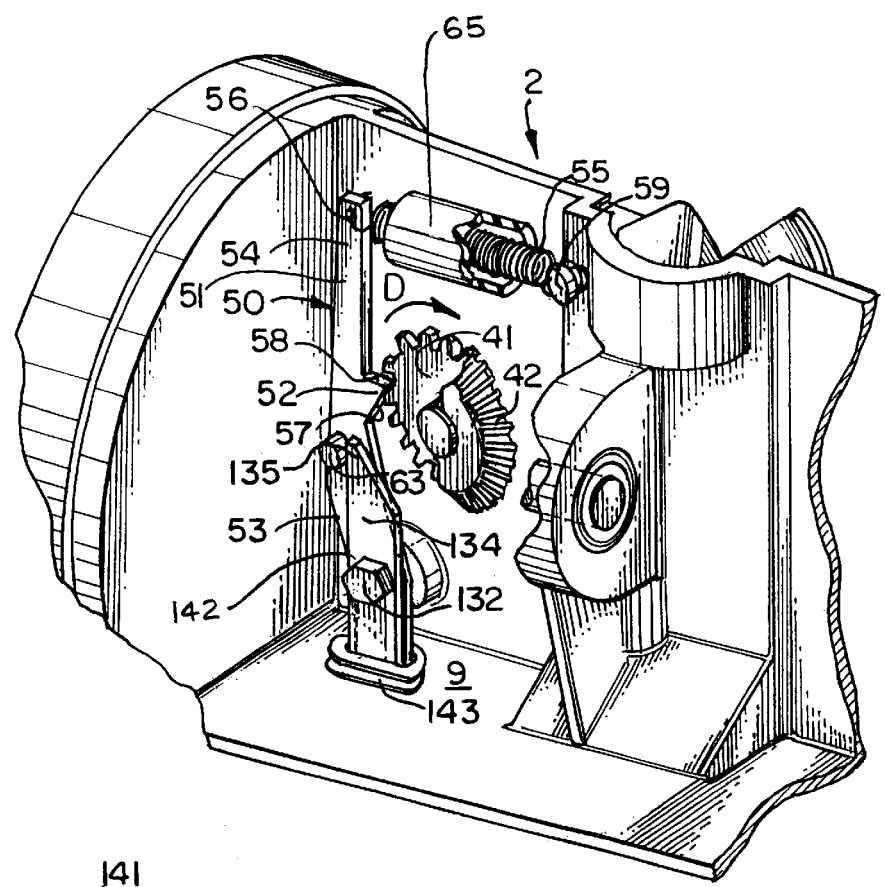
FIG. 7 is an enlarged fragmented isometric partial cut-away view of the cable lasher of FIG. 1, showing components of the latch assembly, including an adjustment screw.

A latching assembly 50 is configured to limit motion of the lasher 2 so as to maintain a tight wind in the lashed wire 7. Referring now to FIG. 7, the latching assembly 50 includes a latch 52 that engages the gear assembly to substantially prevent the drive wheels 10, 12 from rotating in a rearward direction on the strand 3. In this way, reverse torque in the gear assembly and reverse rotation of the drum 8 are restricted. This substantially prevents unwinding or loss of tension in the lashed wire 7.

The components of the gear assembly and latching assembly 50 will now be described in more detail. The gear assembly includes a first gear train 20, as shown in FIG. 5, and a second gear train 40, as shown in FIG. 2, that respectively cooperate with the drive wheels 10, 12. The front drive wheel 10 is mounted on a front drive axle 15 that cooperates with the first gear train 20, such that rotation of the front drive wheel along the strand 3 translates torque to the first gear train. The rear drive wheel 12 is mounted on a rear drive axle 16 that cooperates with the first gear train 20 and the second gear train 40, such that rotation of the rear drive wheel along the strand 3 translates torque to both the first and second gear trains. Since the front and rear drive wheels 10, 12 are both associated with the first gear train 20, rotation of the front and rear drive wheels are integrally linked, such that one drive wheel does not rotate independently of the other drive wheel.

Figure 8:
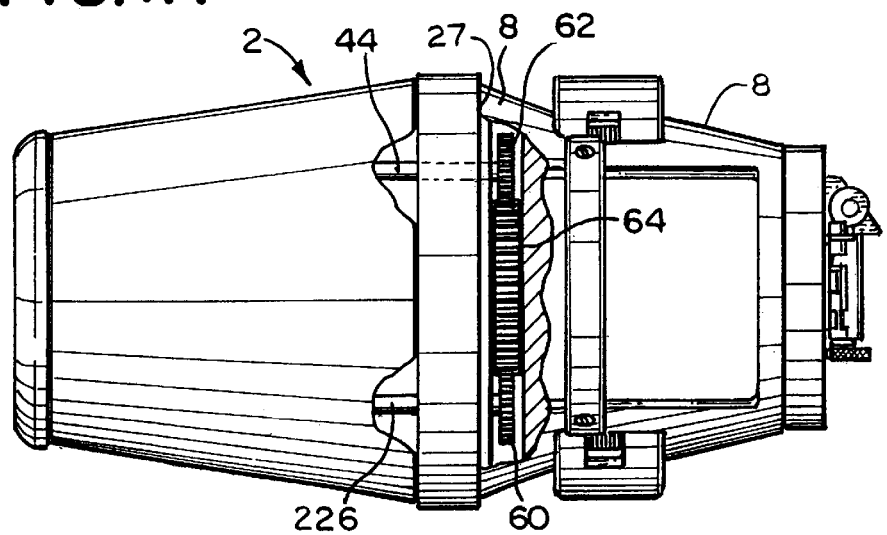
FIG. 8 is a top plan view of the cable lasher of FIG. 1, with partial cutaway showing an internal ring gear assembly.

Referring now to FIGS. 5, 6 and 8, the first gear train 20 comprises a first drive gear 21 mounted on the front drive axle 15 so as to rotate in response to rotation of the front drive wheel 10. Similarly, a second drive gear 22 is mounted on the rear drive axle 16 so as to rotate in response to rotation of the rear drive wheel 12 and to function to drive the second drive wheel in response to rotation of the first drive wheel 10. For this purpose, an idler gear 23 is mounted in engagement with both the first and second drive gears 21, 22 to integrally link the two drive gears and the two drive wheels 10, 12. A first bevel gear 24 is mounted coaxially with the second drive gear 22 on the rear drive axle 16 so as to rotate in response to rotation of the rear drive wheel 12. A second cooperating bevel gear 25 is mounted on a first transfer shaft 26. The second bevel gear 25 transversely engages the first bevel gear 24 to translate torque from the rear drive axle 16 to the first transfer shaft 26. The first transfer shaft 26 is mounted through an aperture in the rear wall 27 of the front gear train section 6 and terminates on the opposite side of the rear wall. A first transfer gear 60 is mounted on the terminal end of the first transfer shaft 26 on the opposite side of the rear wall 27, as shown in FIG. 8. The first transfer gear 60 engages a large stationary segmented ring gear 64 on the front end of the drum 8 and rotates along the perimeter of the ring gear to transfer torque to the ring gear to cause rotation of the drum. As such, the first transfer gear 60 is configured to rotate on the segmented ring gear 64 and thereby drive rotation of the ring gear 64 in response to torque transferred from the first and second drive wheels 10, 12. The ring gear 64 is fixed relative to the rear drum 8 so that the rear drum 8, in turn, rotates relative to the front section 6 in response to the rolling engagement between the first transfer gear 60 and segmented ring gear 64.

Referring now to FIGS. 2 and 7, the second gear train 40 includes some components that generally mirror components in the first gear train 20 but also eliminates some of the components of the first gear train 20. In particular, the second gear train 40 comprises a brake gear 41 mounted on the rear drive axle 16 so as to rotate in response to rotation of the rear drive wheel 12. A third bevel gear 42 is mounted coaxially with the brake gear 41 on the rear drive axle 16 so as to rotate in response to rotation of the rear drive wheel 12. The brake gear 41 may be integral with the third bevel gear 42. A fourth bevel gear 43 is mounted on a second transfer shaft 44 and transversely engages the third bevel gear 42 to translate torque from the rear drive axle 16 to the second transfer shaft. The second transfer shaft 44 is mounted through an aperture in the rear wall 27 of the front gear train section 6 and terminates on the opposite side of the rear wall. A second transfer gear 62 is mounted on the terminal end of the second transfer shaft 44 on the opposite side of the rear wall. Like the first transfer gear 60, the second transfer gear 62 engages the large segmented ring gear 64 on the front end of the drum 8 and rotates along the perimeter of the ring gear to transfer torque to the ring gear and drum. The second transfer gear 62 is configured to rotate on the segmented ring gear 64 in response to torque transferred from the second drive wheel 12. The second transfer gear 62 rotatably engages the large ring gear 64 in the same direction as the first transfer gear 60 when the lasher 2 is pulled forwardly on the strand 3. Therefore, the rear drum 8 rotates relative to the front section 6 in response to the rolling engagement between the ring gear 64 and the first and second transfer gears 60, 62.

The latching assembly 50 engages the second gear train 40 so as to restrict rotation of the drive wheels in the reverse or rearward direction. In particular, the latching assembly 50, as shown in FIG. 7, comprises a latch tooth 52 that releasably engages the sprocket grooves of the brake gear 41 in the second gear train 40 to restrict rotation of the brake gear 41 and therefore bevel gear 42 in one direction, such that the lasher 2 is only movable on the strand 3 in the forward direction. Referring to FIG. 7, forward movement of the lasher 2 on the strand 3 would correspond with a clockwise rotation of the brake gear 41 and the bevel gear 42 as shown schematically by the curved arrow labeled "D". As such, the latch tooth 52 acts a ratchet pawl, permitting clockwise rotation of the brake gear 41 and limiting counterclockwise rotation of the brake gear and therefore the bevel gear 42. The latch tooth 52 extends from a lever arm 51, which serves as a pawl, having a first end 53 and a second end 54. The first end 53 of the lever arm 51 is pivotally mounted on an eccentric screw 132, which will be described subsequently in greater detail. The second end 54 is connected to a tension spring 55 for biasing the lever arm 51 and latch tooth 52 into engagement with the brake gear 41. The tension spring 55 has a first end anchored to a screw 59 mounted on the frame 9 and a second end connected to the lever arm 51 through an aperture 56 in the second end 54 of the lever arm.

The latch tooth 52 is configured to slidingly engage the gear teeth on the brake gear 41 and penetrate into the sprocket grooves between adjacent teeth on the brake gear. The latch tooth 52 has a first face 57 and a second face 58 that converge together to form a V-shaped tooth. Teeth on the brake gear 41 contact the first face 57 of the latch tooth 52 when the brake gear rotates in a clockwise direction, and contact the second face 58 when the brake gear rotates in a counterclockwise direction. The first face 57 is oriented such that contact with the brake gear 41 during clockwise rotation disengages the latch tooth 52 from the brake gear. More specifically, the first face 57 is oriented so that gear teeth on the brake gear 41 slidably engage the first face during clockwise rotation. The orientation of the first face 57 directs the contact force from the gear teeth in a direction generally transverse relative to the longitudinal axis of the lever arm 51, deflecting the arm outwardly or away from the brake gear. The second face 58 is oriented such that engagement between the brake gear and the second face substantially prevents counterclockwise rotation of the brake gear. More specifically, the orientation of the second face 58 directs the contact force from the gear teeth along the longitudinal axis of the lever arm 51. As the brake gear 41 begins to rotate counterclockwise, most of the force is directed toward the pivot connection at the first end 53 of the lever arm 51, resulting in no outward deflection of the lever arm. As such, the lever arm 51 and latch tooth 52 remain in a stationary or braked engagement in response to counterclockwise torque on the brake gear, substantially preventing reverse or counterclockwise rotation of the brake gear. The braking action on the brake gear substantially limits reverse rotation of the drive wheels 10, 12.

Figure 7A:
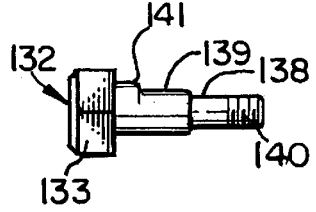
FIG. 7A is an enlarged side elevation detail view of the adjustment screw shown in FIG. 7.

Ordinarily, if the latch assembly 50 engages the brake gear too tightly, the latch hook 52 may unnecessarily impede normal clockwise rotation of the brake gear 41 and limit forward motion of the lasher 2. Therefore, the latch assembly 50 includes a mechanism to adjust the braking action between the latch hook 52 and the brake gear 41. The mechanism comprises a linkage assembly operable to adjust the lateral position of lever arm 51 relative to the brake gear 41. In particular, the mechanism includes a link 134 mounted on a common pivot with the first end 53 of the lever arm 51. The link 134 is mounted generally parallel with and adjacent to the lever arm 51. An upper end 135 of the link 134 extends in proximity to a central portion of the lever arm 51. A lower end 136 of the link 134 extends through a slot 143 in the frame 9 where it engages a release assembly on the lower section of the frame, which will be described subsequently in greater detail. A center section 142 of the link 134 includes a circular bore which aligns coaxially with a circular bore in the first end 53 of the lever arm 51. The link 134 and lever arm 51 are held together on a common pivot axis by an eccentric screw 132 inserted through the link and the lever arm. Referring now to FIG. 7A, the screw 132 has a hexagonal screw head 133 and a generally cylindrical screw shaft 138. The shaft 138 has an enlarged diameter section 139 adjacent the screw head 133 and a partially threaded reduced diameter section 140. Preferably, the enlarged diameter section 139, the reduced diameter section 140 and the screw head 133 are coaxial along a common longitudinal axis. The threaded reduced diameter section 140 is configured to mate with a threaded bore in the side of the frame. As such, the eccentric screw 132 can be inserted through the link 134 and lever arm 51 and screwed into the threaded bore in the frame 9 to pivotally connect the link 134 and lever arm 51 to the frame.

The screw 132 is operable to vary the position of the lever arm 51 relative to the brake gear 41 and adjust the engagement between the latch tooth 52 and the brake gear 41. An eccentric lobe 141 protrudes from the enlarged diameter section 139 of the screw shaft 138, forming a large diameter circular section, or alternatively an oval-like shape section, that is axially offset from the longitudinal axis of the rest of the screw shaft. The eccentric lobe 141 has an axial width on the shaft 138 that extends into the interior of bore in the link, but not into the interior of the bore in the lever arm 51. The eccentric lobe 141 rotates in response to rotation of the eccentric screw 132 and slidably engages the interior circumference of the bore in the link 134. The screw 132 is configured to rotate on a fixed longitudinal axis, while the eccentric lobe 141 slidably engages the interior circumference of the bore in a cam-like fashion and exerts an outward force on the link 134. The outward force from the lobe 141 in the bore of the link 134 pivots the upper and lower ends of the link relative to the center section 142 of the link having the circular bore through which eccentric screw 132 passes. The upper end 135 of the link 134 engages a boss 63 projecting from the lever arm 51 such that lateral movement of the upper end of the link 134 displaces the lever arm 51 relative to the brake gear. As such, the eccentric screw 132 is operable to displace the link 134 relative to the brake gear, which in turn changes the position of the lever arm 51 and the latch tooth 52 relative to the brake gear 41 to adjust the engagement force between the latch tooth and the gear teeth of the brake gear 41. The eccentric lobe 141 may be rotated in the link to reciprocate the lever arm 51 and latch tooth 52 outwardly and inwardly from the brake gear 41 to respectively decrease and then increase the contact force between the lever arm 51 and the brake gear 41. In the case of outward deflection, the first end 54 of lever arm 51 is deflected outwardly against the tensile force exerted on the first end by the tension spring 55. The stress resistance of the tension spring 55 is sufficiently low to allow the first end 53 of the lever arm 51 to deflect easily under the influence of the link 134 and eccentric lobe 141. A flexible shield material 65 may be placed around the tension spring 55 to protect the spring coils from contacting gear components or debris that could lodge between the coils. Referring to FIGS. 6–7, a piece of Tygon tubing 65 is shown covering the tension spring 55 to protect the spring coils.

Figure 9:
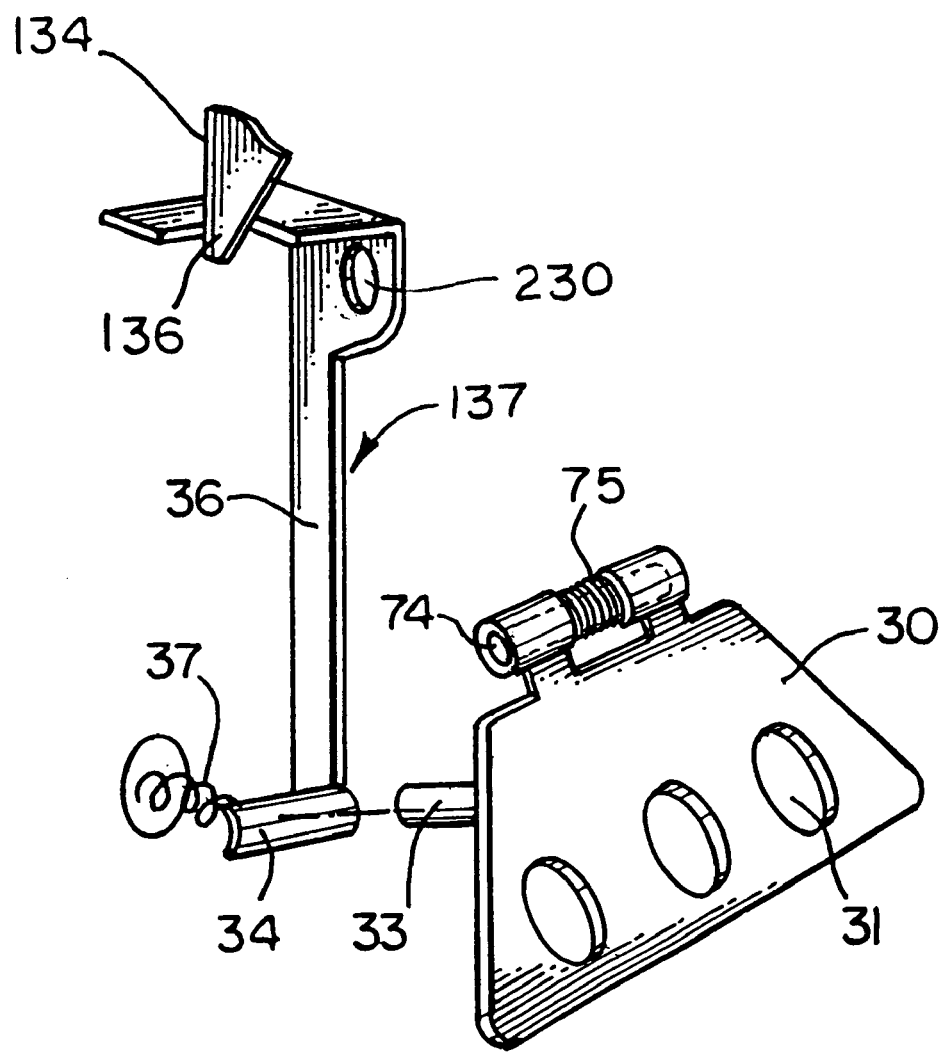
FIG. 9 is an enlarged isometric view of components of a release mechanism of the cable lasher of FIG. 1.

The latch assembly 50 may be manually disengaged, when desired, to permit reverse motion of the frame 9 on the strand 3 and reverse rotation of the rear drum 8 so as to unwind a section of lashed wire. Referring now to FIGS. 1 and 9, a release mechanism 137 cooperates with the lower end 136 of the link 134 and is configured to deflect the lower end laterally. In particular, the release mechanism 137 is operable to displace the lower end 136 of the link 134 and pivot the upper end 135 of the link so as to deflect the lever arm 51 and latch tooth 52 out of engagement with the brake gear 41. The release mechanism is actuated by pushing on the pull handle 30 which is pivotally mounted to the underside of the front gate assembly. The pull handle 30 is pivotal between a pulled position during forward towing of the lasher 2, and a depressed position for disengaging the latch assembly to permit reverse towing of the lasher. The pull handle 30 is hingedly connected to an axle 74 on the underside of the front gate 70 to permit pivoting between the pulled and depressed positions. A torsion spring 75 on the axle 74 engages the pull handle 30 and biases the pull handle toward the pulled position.

The pull handle 30 pivots to the depressed position in response to a push force on the pull handle that is directed generally downwardly or toward the drum 8. Such push force may be applied through a reverse pulling of the tow bridle 35 attached through the apertures 31 in the front end of the pull handle. In such a case, the force on the front end of the plate creates a moment about the axle 74 that opposes the bending resistance of the torsion spring 75. The pull handle 30 is rotatable to the depressed position in response to a moment of sufficient magnitude to overcome the resistance of the torsion spring. A release bar 33, as shown in FIG. 9, on the underside of the pull handle 30 is configured to contact a release arm 34 in response to the push force on the pull handle 30. The release arm 34 extends from a pivot arm 36 hingedly connected to the frame 9 at bore 230. The release bar 33 is configured to impart a force on the release arm 34 when the pull handle is moved to the depressed position. More specifically, the release bar 33 is configured to displace the release arm 34 between a first position, in which the release arm extends forwardly, and a second position, in which the release arm is depressed rearwardly. The pivot arm 36 is configured to rotate on the hinge connection in response to displacement of the release arm 34 from the first position to the second position. An upper end of the pivot arm 36 contacts the lower end 136 of the link 134, and is configured to displace the lower end of the link laterally when the pivot arm 36 is rotated by displacement of the release arm 34. The link 134 is pivotal through the slot 143 in the frame to allow the upper end of the link to pivot, as seen best in FIG. 7. More specifically, the upper end of the link 134 is configured to pivot outwardly and away from the brake gear 41 in response to a force applied to the lower end 136 of the link 134 by the pivot plate 36. As such, the pull handle 30 is operable to pivot the link 134 and displace the lever arm 51 to disengage the latch hook 52 from the brake gear 41 enabling reverse rotation of the brake gear, the drum, and the drive wheels.

A compression spring 37 contacts the release arm 34 opposite the side on which the release bar 33 contacts the release arm. The compression spring 37 is configured to impart a bias force on the release arm 34 to maintain the release arm 34 in the first position and maintain the upper end of the pivot arm 36 out of engagement with the link 134. When the pull handle 30 is moved to the depressed position, the spring 37 is configured to compress under the force of the release bar 33 to allow the release arm 34 to move to the second position. The bias of the spring 37 is sufficient to return the release arm 34 to the first position when the force on the release arm is removed.

Figure 10:
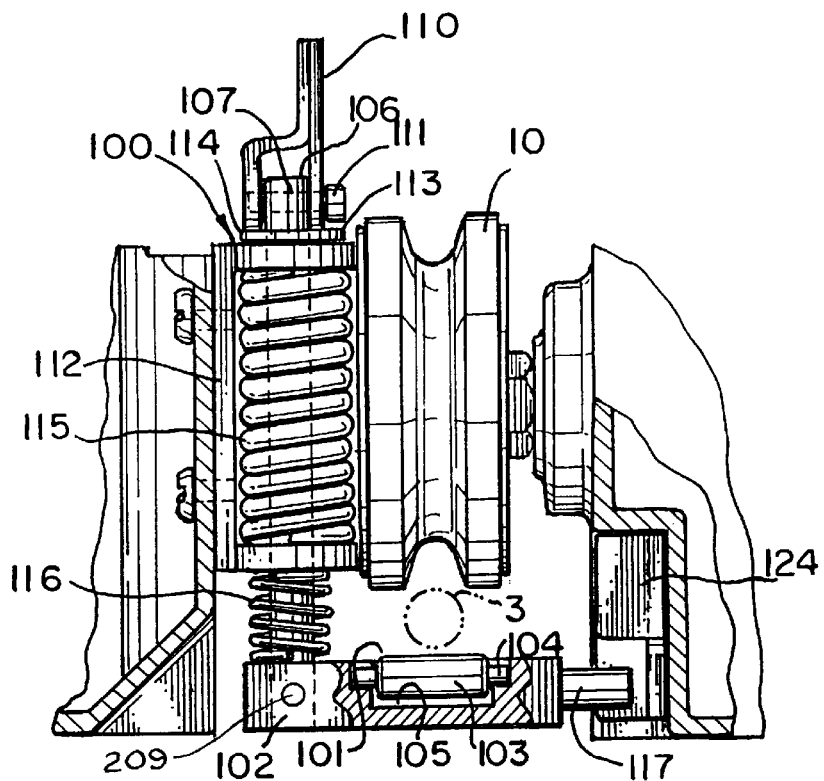
FIG. 10 is an enlarged fragmented partial sectional view of the cable lasher of FIG. 1, showing a strand lock mechanism disposed in a lowered or disengaged position in the interior channel of the cable lasher.

Referring now to FIG. 10, the engagement between the drive wheels 10, 12 and the support strand 3 is controlled by a strand lock mechanism generally designated 100. The strand lock mechanism 100 includes a locking bar 102 that is operable to engage the underside of the support strand 3 and tightly clamp or hold the strand in engagement with the drive wheels 10, 12. The locking bar 102 is generally rectangular and comprises a hollowed cavity 105 that is centrally located in the bar. A roller 103 is rotatably mounted on an axle 104 in the cavity 105 of the locking bar 102. The roller 103 projects through a rectangular opening 101 on the top of the locking bar and is configured to engage the underside of the support strand 3. More specifically, the locking bar 102 is configured to clamp or engage the support strand 3 such that the underside of the strand contacts the surface of the roller 103 and rides over the roller as the lasher 2 is pulled along the strand.

Referring now to FIGS. 10–14, the locking bar 102 is movable between a raised position and a lowered position for respectively clamping and unclamping the strand 3. The locking bar 102 is moved between the raised and lowered positions by a generally vertical cylindrical shaft 106 having an upper end 107 and a lower end 108. The lower end 108 of the shaft 106 extends through a bore 109 in one end of the locking bar 102 and is integrally connected to the locking bar by a pin connection 209. The locking bar 102 is configured to rotate in response to rotation of the shaft 106 through the pin connection 209 that secures the shaft 106 to the bar 102. A lever handle 110 is connected to the upper end 107 of the shaft 106 and is operable to control the rotational orientation and the vertical position of the shaft and locking bar 102. The lever handle 110 is pivotally mounted at the upper end 107 of the shaft 106 on a pin 111 inserted through the handle and the shaft.

Figure 11:
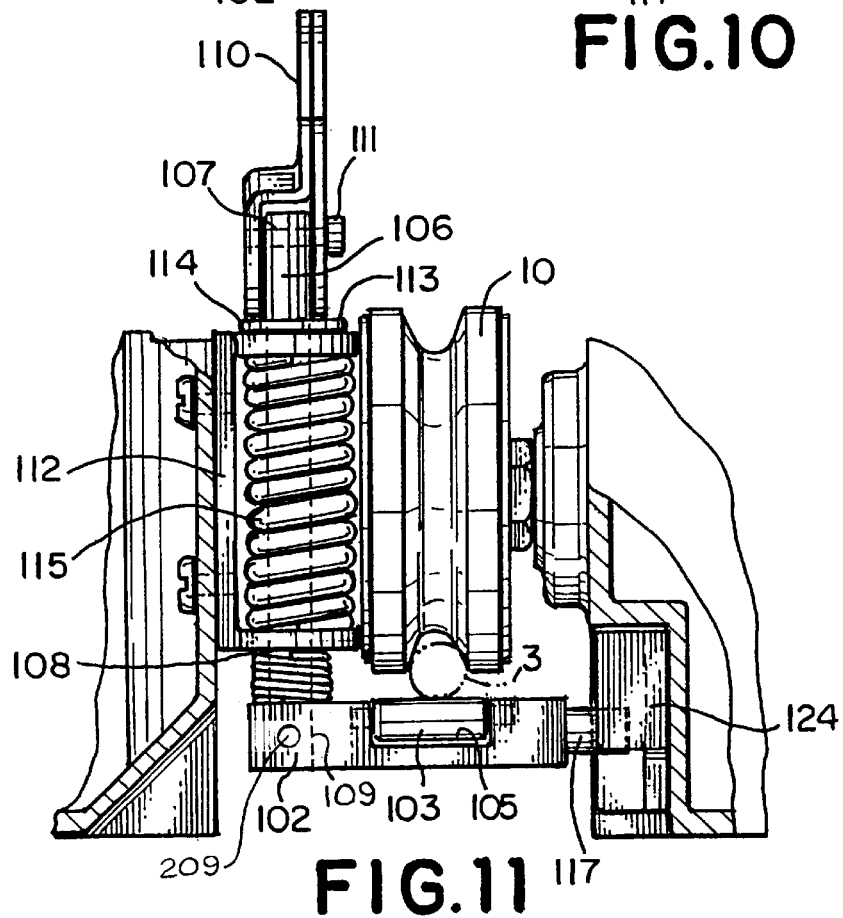
FIG. 11 is an enlarged fragmented partial sectional view of the cable lasher of FIG. 10, showing a strand lock mechanism moved to a raised or engaged position in a first closed-position bracket.

The shaft 106 is rotatably mounted on a stationary hinge plate 112, which is bolted to the interior of the frame 9, as shown in FIGS. 10–11. The shaft 106 is disposed through a pair of axially aligned hinge bores in the hinge plate 112, so that the shaft is maintained on a fixed pivot axis. A cylindrical bushing 113 circumscribes the shaft 106 and extends through one of the bores on the hinge plate 112. The top end of the bushing 113 forms a circular flange 114 that sits beneath the lever handle 110. The bottom edge of the bushing 113 engages a large compression spring 115 that circumscribes the shaft 106 and rests on an interior surface of the hinge plate 112. The large spring 115 has an exterior diameter generally equal to the exterior diameter of the bottom edge of the bushing 113. The spring 115 abuts against the bottom edge of the bushing 113 and imparts an upward bias force on the bushing and lever handle 110.

Figure 15:
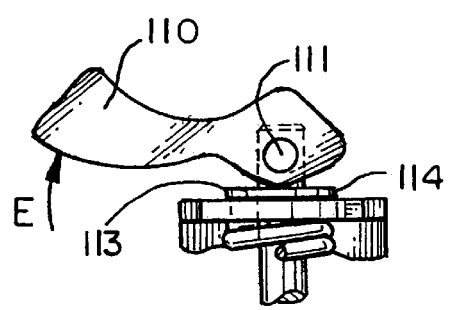
FIG. 15 is an enlarged fragmented side elevation view of the strand lock mechanism of FIG. 10, showing a release lever rotated to an unlocked position corresponding to the lowered, disengaged position of the strand lock.
Figure 16:
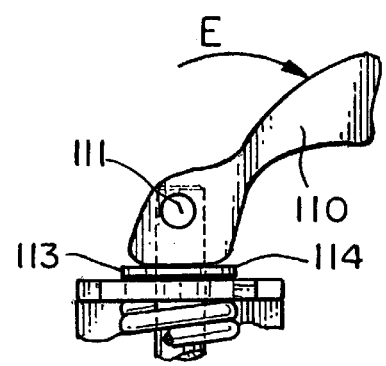
FIG. 16 is an enlarged fragmented side elevation view of the strand lock mechanism of FIG. 10, showing the release lever rotated to a locked position corresponding to the raised, engaged position of the strand lock.

Referring now to FIGS. 15–16, the lever handle 110 may be pivoted on top of the bushing flange 114 on the bushing 113 to raise and lower the locking bar 102. More specifically, as shown in FIGS. 15 and 16, the handle 110 is pivotable about the pin 111 between an unlocked position shown in FIG. 10 and a locked position shown in FIG. 11 to vertically displace the shaft 106 and pin 111 relative to the hinge plate 112. In the unlocked position, the shaft 106 and pin 111 are disposed in a lowered position relative to the hinge plate 112, as shown in FIG. 15. In the locked position, the shaft 106 and pin 111 are moved to a raised position relative to the hinge plate 112, as shown in FIG. 16. The direction of rotation of the lever handle 110 from the unlocked position to the locked position is shown schematically in FIGS. 15–16 by the curved arrows labeled "E". The handle 110 has an irregular shape with rounded corners so that the handle can slide and cam against the flange 114 during rotation of the handle. The large compression spring 115 is configured to bear upwardly against the bushing 113 so that the bushing resists downward deflection as the irregularly shaped handle is rotated on the flange 114. In this way, the bushing supplies leverage to the handle such that the bushing and flange remain relatively stationary and the shaft 106 moves linearly and vertically relative to the hinge plate in response to handle rotation. The upward force of the large compression spring 115 on the bushing 113 also creates frictional resistance between the flange 114 and the handle 110. This limits the sliding mobility of the handle 110 so that the handle remains stationary once it is set in the locked or unlocked position. The strand lock 100 is configured to permit the locking bar to be locked tightly against strands of different sizes. In particular, when a relatively large diameter strand is secured by the locking bar, the large spring 115 is configured to compress or yield under the force of the lever 110 and bushing 113 to allow the lever to be completely rotated to the locked position.

The shaft 106 is vertically displaceable through the bushing 113 and hinge plate 112 in response to vertical displacement of the pin 111. As such, the locking bar 102 can be raised and lowered in response to rotation of the lever handle 110 on top of the bushing. A small compression spring 116 circumscribes the shaft 106 between the locking bar 102 and the underside of the hinge plate 112, as shown in FIGS. 10–11. The small spring 116 bears against the underside of the hinge plate 112 so as to bias the locking bar 102 downwardly to a lower, unlocked position. When the lever 110 is rotated to move the shaft 106 upwardly, the locking bar 102 moves upwardly against the bias of the small spring 116 and compresses the small spring against the underside of the hinge plate 112. When the lever 110 is rotated to move the shaft 106 downwardly, the locking bar moves downwardly with the bias of the small spring 116. The small spring 116 is configured to bias the locking bar 102 downwardly while the locking bar is in the unlocked position so as to stabilize the locking bar. In this way, the small spring 116 maintains the locking bar 102 in the lowered unlocked position and restricts the locking bar and shaft 106 from bouncing or rattling relative to the hinge plate 112.

Figure 12:
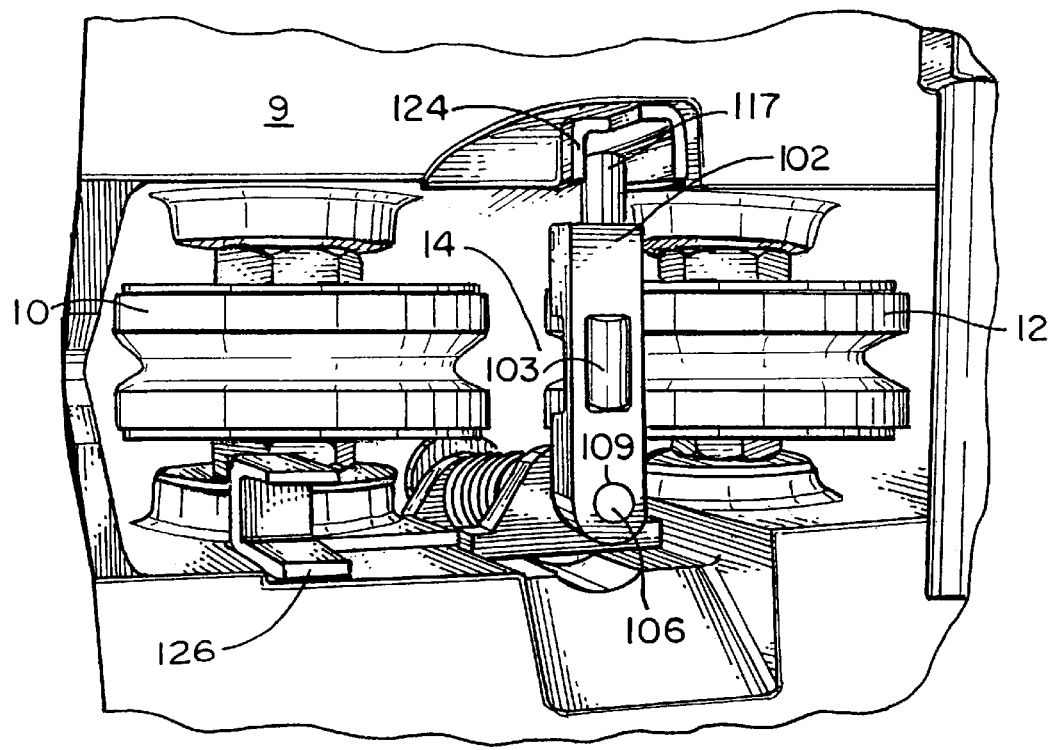
FIG. 12 is an enlarged fragmented bottom plan view of the underside of the cable lasher of FIG. 10, showing the strand lock mechanism disposed in the raised or engaged position in the first closed-position bracket.
Figure 13:
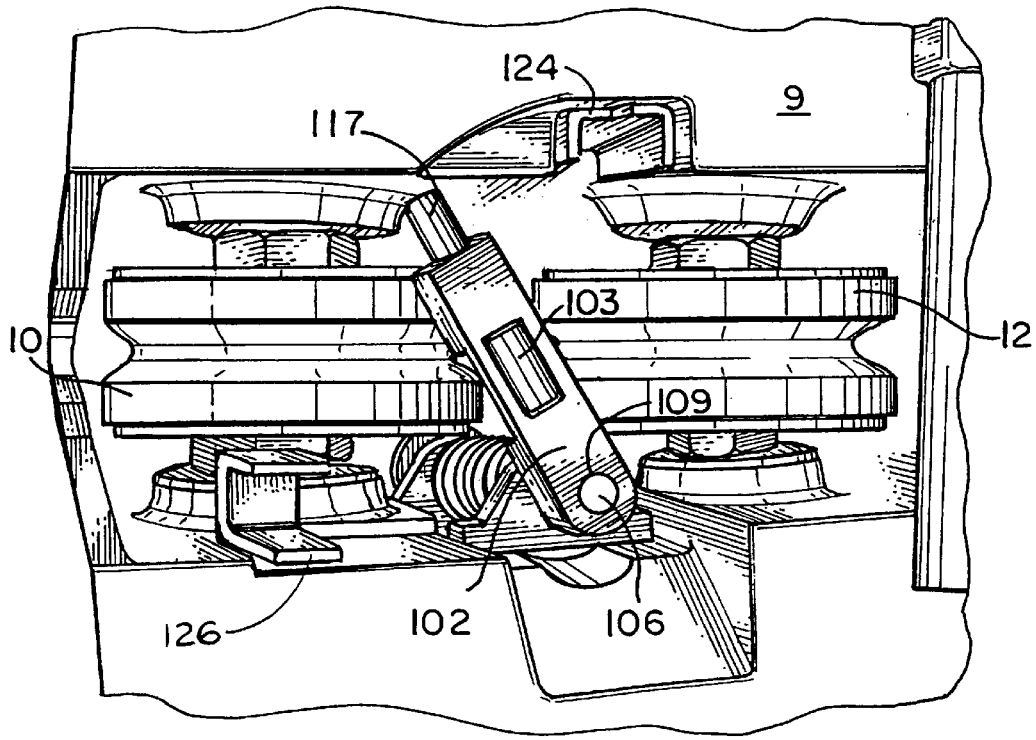
FIG. 13 is an enlarged fragmented bottom plan view of the underside of the cable lasher of FIG. 10, showing the strand lock mechanism pivoted away from the first closed-position bracket toward the open position of the strand lock mechanism.
Figure 14:
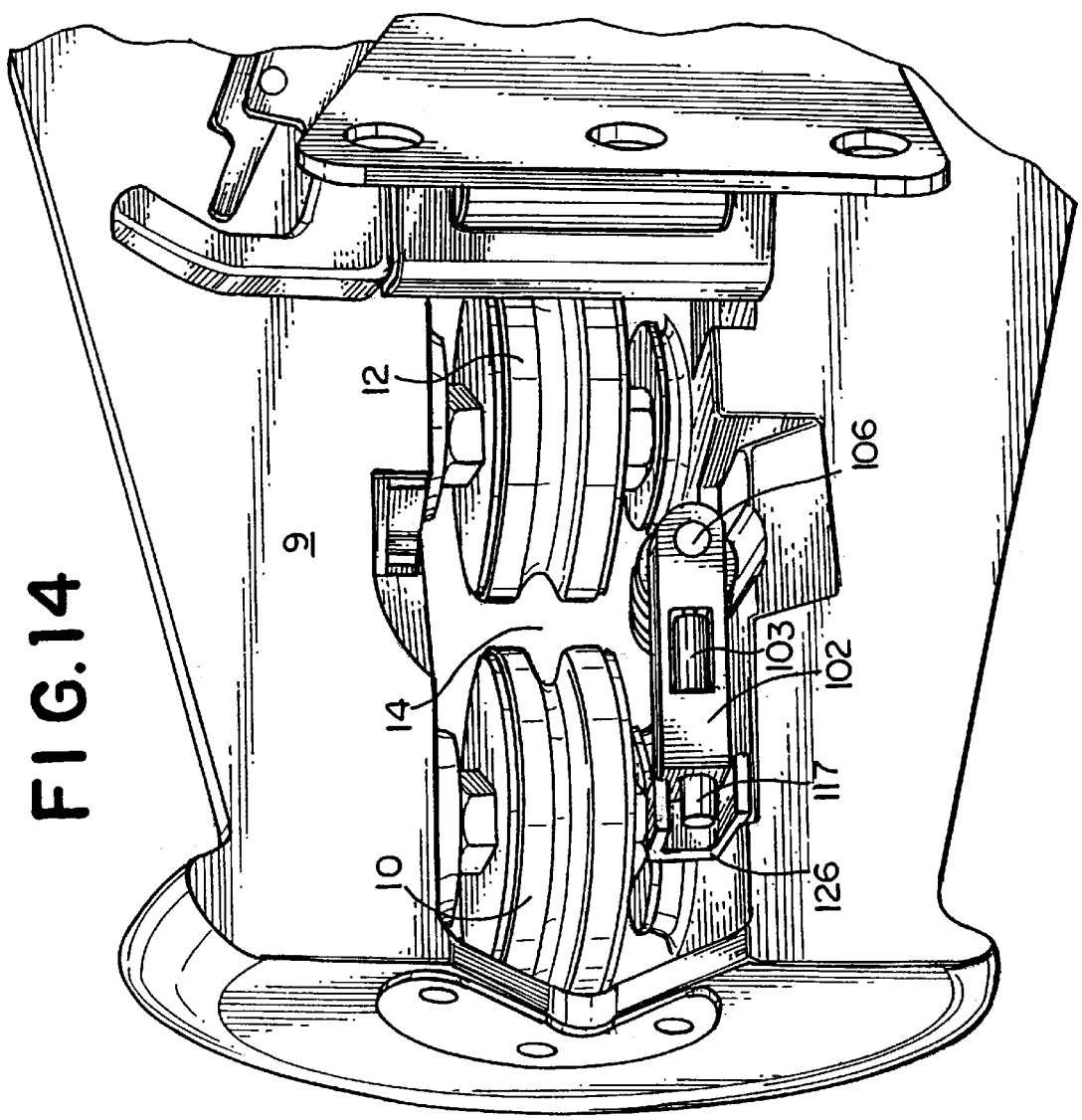
FIG. 14 is an enlarged fragmented bottom plan view of the underside of the cable lasher of FIG. 10, showing the strand lock mechanism pivoted to the open position and raised into a second open-position bracket, and out of the interior channel of the cable lasher.

Referring again to FIGS. 12–14, the locking bar 102 is configured to pivot, or rotate horizontally, between a closed orientation and an open orientation when the bar is in the lower, unlocked position. In the closed orientation, the locking bar 102 is rotated into the central channel of the lasher so as to cross the channel in a direction generally perpendicular to the strand 3, as shown in FIGS. 11 and 12. Once the locking bar 102 is pivoted to the closed orientation, the locking bar is movable to the raised, locked position by use of the lever handle 110 to clamp the locking bar against the underside of the strand 3. The locking bar 102 includes a cylindrical toe 117 that extends from the free end of the locking bar. A first closed-position bracket 124 is mounted on the underside of the frame 9 and is adapted to receive the toe portion 117 of the locking bar 102 as the bar is moved while in the closed orientation to the raised, locked position. In the closed rotational orientation, as shown in FIG. 12, and in the raised, locked vertical position, as shown in FIG. 11, further rotation of the locking bar 102 is limited by the sides of the first bracket 124, which limit lateral or rotational movement of the toe 117. As such, the first bracket substantially prevents the locking bar 102 from being pivoted out of the closed orientation while it engages the underside of the strand 3. The locking bar 102 may be lowered out of the bracket 124 by turning the lever handle 110. Once lowered, the locking bar 102 may then be rotated out of the closed orientation, as shown in FIG. 13.

In the rotationally open orientation, the locking bar 102 is rotated out of the channel 14 and extends along a side of the channel. As in the closed orientation, the locking bar is movable to the raised, locked vertical position by use of the lever handle 110. A second closed-position bracket 126 is mounted to the underside of the frame 9 and is adapted to receive the toe portion 117 of the locking bar 102 as the bar is moved to the raised locked position while in the open rotational orientation. In this raised position and the open rotational orientation, further rotation of the locking bar 102 is limited by the sides of the second bracket 126, which limit lateral or rotational movement of the toe 117, similar to the first bracket. As such, the second bracket 126 substantially prevents the locking bar 102 from being pivoted out of the open orientation once it is moved to the raised locked position. In this way, the locking bar can be locked in a position out of the channel 14 to permit the lasher 2 to be placed over the support strand 3 and cable 5. In addition, the locking bar can be locked out of the channel 14 to permit the lasher 2 to be used in an overlashing operation.

Operation of the lasher 2 will now be described. Lashing wire 7 is loaded onto the lasher 2 by opening one or both of the lashing wire compartments 150, 160. The lashing wire compartment 150 is opened by unlocking the locking mechanism 152 on the hinged door 151. Referring to FIG. 2, the door 151 is opened by unscrewing the wing nut and pulling the door outwardly over the threaded bolt. A coil 13 of lashing wire is loaded into the compartment and the door 151 is closed and secured over the bolt using the wing nut. The lasher 2 is then moved into proximity of a supporting strand 3. The lasher 2 may be carried and manipulated by hand using the handle bar 17 on the rear drum section 8. With one hand on the handle bar 17 and the other hand supporting the front section 6, the rear drum 8 is rotated relative to the front section so that the channel 14 is opened and aligned between the drum and the front section. The front gate assembly 70 is unlatched from the front face of the frame to the open position, and the rear gate assembly 80 is opened by depressing the thumb latch 81. The lever handle 110 is rotated to pivot the locking bar 102 out of the channel. The handle 110 is then turned on top of the bushing flange to move the locking bar 102 into the second bracket 126 and out of the channel. The frame 9 is lowered over the support strand 3 and loosely suspended cable 5 so that the strand and cable extend inside the channel 14. In particular, the frame 9 is lowered so that the drive wheels 10, 12 rest on top of the strand 3, and the strand is positioned between the guide rollers 86 at the rear of the lasher 2. The adjustment bolt 87 is rotated to adjust the spacing between the guide rollers 86 so that the rollers contact the cable 5.

Once the lasher 2 is properly straddled over the strand 3, the lever handle 110 is turned on the pin connection 111 to release the locking bar 102 to the lowered, unlocked position out of the second bracket. The lever handle 110 is then rotated approximately 90° from the open orientation to pivot the locking bar 102 into the channel 14, as shown in FIG. 12. As the locking bar 102 is pivoted into the channel 14, the locking bar is maneuvered over the cable 5 and under the strand 3. The lever handle 110 is then turned to move the locking bar 102 upwardly into the raised, locked position in engagement with the underside of the strand 3 as shown in FIG. 11. When the lever handle 110 is fully turned on the flange, the toe 117 on the locking bar 102 is releasably retained in the first bracket, and the locking bar is retained in the raised, locked position against the strand. The front gate 70 and rear gate 80 are then closed around the cable 5 and the strand 3. More specifically, the front gate and rear gate are closed so that the cable 5 rests on roller bars 73, 83. The threaded rod 88 is rotated to adjust the height of the rear roller bar 83 so that the cable 5 is held in close engagement with the strand 3 at the rear end of the lasher 2. A free end of lashing wire is fed through the dispensing pulley 153 in the door 151 and looped around the first snubbing pulley 154. The wire 7 is then looped around the second snubbing pulley 155 and secured to the strand 3 or the support using a lashing wire clamp or other device used in the art.

A bridle 35, winch or other pulling mechanism is connected to the pull handle 30 as shown in FIG. 1. A bridle 35 or other towing mechanism may also be connected to one of the loop handles 226. The bridle 35 is pulled from below the support strand 3 and cable 5 to move the lasher 2 forwardly on the support strand. The pulling force is directed downwardly and forwardly on the lasher 2. The downward component of force, plus the weight of the lasher 2, causes the drive wheels 10, 12 to frictionally engage the support strand 3. The drive wheels 10, 12 rotate in a forward direction in response to the frictional engagement with the strand 3. As the front and rear drive wheels 10, 12 rotate forwardly, the first and second gear trains 20, 40 are driven to translate forward linear movement of the lasher to rotational movement of the rear drum 8. More specifically, the first and second drive gears 21, 22 rotate forwardly in response to rotation of the front and rear drive wheels 10, 12. The first and second drive gears 21, 22 transfer torque through the first drive train 20 to cause the first transfer gear 60 to rotatably engage the large ring gear 64. The bevel gear 42 rotates forwardly in response to rotation of the rear drive wheel 22 and transfers torque through the second gear train 40 to cause the second transfer gear 62 to rotatably engage the large ring gear 64. The transfer gears 60, 62 rotate on the large ring gear 64 in the same direction, causing the ring gear 64 and drum 8 to rotate relative to the front section 6.

The support strand 3 and cable 5 move through the channel 14 as the lasher 2 is advanced forwardly. The loosely hung cable 5 is lifted into proximity to the strand 3 by the front gate assembly 70. More specifically, the front roller bar 73 on the front gate assembly 70 contacts the underside of the cable 5 and lifts the cable upwardly. The cable 5 rides over the front roller bar 73, through the channel 14 and over the rear roller bar 83. As the lasher 2 is pulled forwardly, the drum 8 rotates to release or wrap lashing wire 7 around the support strand 3 and cable 5, as shown schematically in FIG. 1. Lashing wire 7 is dispensed from the compartment 150, over the dispensing pulley 153 and around the first and second snubbing pulleys 154, 155. The wire 7 leaves the second snubbing pulley 155 and wraps around the strand 3 and cable 5. The forward motion of the lasher 2 and rotational motion of the drum 8 cause the wire 7 to be released in a helical pattern. In addition, the forward movement of the lasher 2 and the rotational movement of the drum 8 generate tension in the lashing wire 7 to tightly wrap the wire around the cable and strand. Tension in the lashing wire 7 is maintained by the ratcheting action of the latching assembly 50. In particular, the latch tooth 52 slidably engages each gear tooth on the brake gear 41 to permit the brake gear 41 to rotate in a clockwise direction. When the forward pulling force on the handline is released, the lasher 2 is prevented from recoiling or drifting backward by the latch tooth 52, which prevents reverse rotation of the brake gear 41 and therefore the reverse rotation of the drive wheels and the drum.

The latching assembly 50 may be adjusted by using the eccentric screw 132. The eccentric screw 132 may be rotated to change the position of the link 134 and lever arm 51 relative to the brake gear 41. In particular, the eccentric screw may be rotated to move the latch tooth 52 into tighter engagement with the brake gear or, alternatively, away from the brake gear creating a looser engagement with the brake gear.

The lasher 2 may be moved backward at any time by pulling the handle 30 down into the lowered or disengaging position. Reversing the lasher 2 may be desired when, for example, an object is inadvertently caught beneath the lashed wire 7 and must be removed. The bridle 35 is pulled downwardly and rearwardly relative to the lasher's forward direction to move the lever 30 into the lowered or disengaged position. As the lever 30 is lowered, the lever arm 51 and latch tooth 52 are pivoted away from the brake gear 41 by the link 134 to permit the brake gear, the drive wheels, and the drum 8 to rotate freely in either direction. The lasher 2 may then be pulled in the backward or reverse direction to release tension in the lashed wire 7. To resume normal operation, the downward and rearward force on the handle 30 is released to allow the handle to move back to the raised position.

The terms and expressions which have been employed are used as terms of description and not of limitation. There is no intention in the use of such terms and expressions of excluding any equivalents of the features shown and described or any portions thereof. It is recognized, therefore, that various modifications are possible within the scope and spirit of the invention. Accordingly, the invention incorporates variations that fall within the scope of the following claims.

We claim:

1. A cable lasher operable on a support strand for attaching a cable to the support strand with wire, comprising:
   (a) a frame that is movable on the cable and the strand;
   (b) a rotating drum attached to the frame;
   (c) a gear assembly for translating motion of the frame on the strand to rotational motion of the drum;
   (d) a latch mechanism engaging the gear assembly for limiting reverse rotation of the drum; and
   (e) an adjustment mechanism for adjusting the engagement between the latch mechanism and the gear assembly.

2. The cable lasher of claim 1 comprising a drive wheel in contact with the strand that rotates as the frame moves on the strand.

3. The cable lasher of claim 1, wherein the latch mechanism comprises:
   (a) an arm configured to engage the gear assembly; and
   (b) a linkage connected to the arm; and wherein
      (c) the adjustment mechanism includes a rotatable adjustment screw inserted through an aperture in the linkage and operable to adjust the engagement between the arm and the gear assembly.

4. The cable lasher of claim 3, wherein the arm includes a pawl and wherein the gear assembly includes a gear cooperating with the pawl, the gear having sprocket grooves for receiving the pawl.

5. A cable lasher operable on a support strand for attaching a cable to the support strand with wire comprising:
   (a) a frame that is movable on the cable and the strand;
   (b) a rotating drum attached to the frame;
   (c) a gear assembly for translating motion of the frame on the strand to rotational motion of the drum;
   (d) a latch mechanism engaging the gear assembly for limiting reverse rotation of the drum, said latch mechanism comprising an arm configured to engage the gear assembly and a linkage connected to the arm; and
   (e) an adjustment mechanism for adjusting the engagement between the latch mechanism and the gear assembly, said adjustment mechanism including a rotatable adjustment screw inserted through an aperture in the linkage and operable to adjust the engagement between the arm and the gear assembly,
wherein the adjustment screw comprises an eccentric shaft that abuts one side of the aperture in the linkage so as to displace the linkage and arm relative to the gear assembly during rotation of the screw.

6. A cable lasher operable on a support strand for attaching a cable to the support strand with wire, comprising:
   (a) a frame that is movable on the cable and the strand, said frame having a front end;
   (b) an elongated cavity in the frame having a width adapted to receive the cable and the strand;
   (c) a rotating drum attached to the frame;
   (d) a gear assembly for translating linear motion of the frame on the strand to rotational motion of the drum; and
   (e) a cable guide projecting from the front end of the frame outside of the cavity for supporting a cable as the cable enters the cavity;
wherein the cable guide comprises a support bar having a rounded top edge for slidably engaging and lifting the cable toward the strand, and a cylindrical roller extending generally parallel to the support bar and positioned behind the support bar relative to the direction that the cable enters the cavity, said roller being positioned relative to the support bar to receive the cable as it slides off the support bar to further lift the cable toward the strand.

7. The cable lasher of claim 6 wherein the roller has a width equal to or greater than the width of the cavity.

8. The cable lasher of claim 6 comprising a drive wheel in contact with the strand that rotates as the frame moves on the strand.

9. A cable lasher operable on a support strand for attaching a cable to the support strand with wire, comprising:
   (a) a frame that is movable on the cable and the strand, said frame having a front end;
   (b) an elongated cavity in the frame having a width adapted to receive the cable and the strand;
   (c) a rotating drum attached to the frame;
   (d) a gear assembly for translating linear motion of the frame on the strand to rotational motion of the drum;
   (e) a cable guide projecting from the front end of the frame outside of the cavity for supporting a cable as the cable enters the cavity; and
   (f) a cylindrical roller disposed on the cable guide for rolling engagement with the cable,
wherein the roller has a width equal to or greater than the width of the cavity.

10. The cable lasher of claim 9 comprising a drive wheel in contact with the strand that rotates as the frame moves on the strand.

11. A cable lasher operable on a support strand for attaching a cable to the support strand with wire, comprising:
   (a) a frame that is movable on the cable and the strand;
   (b) a rotating drum attached to the frame;
   (c) a drive wheel in contact with the strand that rotates as the frame moves on the strand;
   (d) a gear assembly driven by the drive wheel for translating motion of the frame on the strand to rotational motion of the drum;
   (e) a releasable strand lock having a strand lock member operable in a locking orientation in which the strand lock member is positionable to engage the strand in a generally cross-wise direction, and an overlashing orientation in which the strand lock member is pivoted to a longitudinal position relative to the strand and out of engagement with the strand; and
   (f) an actuator connected with the strand lock for alternately securing said strand lock in the locking orientation and the overlashing orientation.

12. The cable lasher of claim 11, wherein the strand lock member comprises a roller bar that is engageable with the strand in a cross-wise direction when the strand lock is in the locking orientation, and is disengaged from the strand when the strand lock is in the overlashing orientation, said roller bar being further displaceable in either orientation between a raised position to alternatively secure the strand lock in the locking orientation and the overlashing orientation, and a lowered position to alternately permit the strand lock to move out of the locking orientation and the overlashing orientation.

13. A cable lasher operable on a support strand for attaching a cable to the support strand with wire, comprising:
(a) a frame that is movable on the cable and the strand;
(b) a rotating drum attached to the frame;
(c) a drive wheel in contact with the strand that rotates as the frame moves on the strand;
(d) a gear assembly driven by the drive wheel for translating motion of the frame on the strand to rotational motion of the drum; and
(e) a releasable strand lock for releasably holding the strand in contact with the drive wheel to drive the drive wheel as the frame moves along the strand, said strand lock comprising a roller bar pivotal between a locking orientation in which the roller bar engages the strand in a cross-wise direction, and an overlashing orientation in which the roller bar is pivoted out of engagement with the strand, said roller bar being further extendable in either orientation between a raised position to alternately secure the roller bar in the locking orientation and the overlashing orientation, and a lowered position to alternately permit the roller bar to move out of the locking orientation and the overlashing orientation wherein the strand lock further comprises:
(1) an arm for rotating the roller bar between the locking orientation and overlashing orientation, and for displacing the roller bar between the raised position and the lowered position;
(2) a spring circumscribing the arm for biasing the roller bar in the lowered position; and
(3) a lever handle connected to the arm for moving and releasably locking the roller bar in the raised position against the bias of the spring, and for releasing the roller bar from the raised position to permit the spring to move the roller bar to the lowered position.

14. A cable lasher operable on a support strand for attaching a cable to the support strand with wire, comprising:
(a) a frame that is movable on the cable and the strand;
(b) a rotating drum attached to the frame;
(c) a drive wheel in contact with the strand that rotates as the frame moves on the strand;
(d) a gear assembly driven by the drive wheel for translating motion of the frame on the strand to rotational motion of the drum;
(e) a releasable strand lock for releasably holding the strand in contact with the drive wheel to drive the drive wheel as the frame moves along the strand, said strand lock comprising a roller bar pivotal between a locking orientation in which the roller bar engages the strand in a cross-wise direction, and an overlashing orientation in which the roller bar is pivoted out of engagement with the strand, said roller bar being extendable between a raised position to alternately secure the roller bar in the locking orientation and the overlashing orientation, and a lowered position to alternately permit the roller bar to move out of the locking orientation and the overlashing orientation; and
(f) a first bracket for retaining the roller bar in the overlashing orientation when the roller bar is in the raised position.

15. The cable lasher of claim 14 comprising a second bracket for retaining the roller bar in the locking orientation when the roller bar is in the raised position.

16. A cable lasher operable on a support strand for attaching a cable to the support strand with wire, comprising:
(a) a frame that is movable on the cable and the strand;
(b) a passage through the frame for receiving the cable and the strand;
(c) a rotating drum attached to the frame;
(d) a drive wheel in contact with the strand that rotates as the frame moves on the strand;
(e) a gear assembly driven by the drive wheel for translating motion of the frame on the strand to rotational motion of the drum;
(f) a strand bar displaceable between a closed position in which the bar is releasably retained in the passage in engagement with the strand for releasably holding the strand in contact with the drive wheel, and an open position in which the bar is moved out of the passage and out of engagement with the strand; and
(g) a lever handle for displacing the bar and alternately locking the bar in the closed position and the open position.

17. The cable lasher of claim 16 comprising a first bracket for retaining the strand bar in the open position.

18. The cable lasher of claim 17 comprising a second bracket for retaining the roller bar in the closed position.

19. A cable lasher operable on a support strand for attaching a cable to the support strand with wire, comprising:
(a) a frame that is movable on the cable and the strand;
(b) a rotating drum attached to the frame;
(c) a gear assembly for translating motion of the frame on the strand to rotational motion of the drum;
(d) a latch mechanism operable between a braked position, in which the latch mechanism engages the gear assembly with an engagement force for limiting reverse rotation of the drum, and a released position, in which the latch mechanism is disengaged from the gear assembly and exerts no force on the gear assembly; and
(e) an adjustment mechanism for adjusting the magnitude of the engagement force exerted by the latch mechanism in the braked position.

20. The cable lasher of claim 19 comprising a drive wheel in contact with the strand that rotates as the frame moves on the strand.

21. The cable lasher of claim 19, wherein the latch mechanism comprises:
(a) an arm configured to engage the gear assembly; and
(b) a linkage connected to the arm; and wherein
(c) the adjustment mechanism includes a rotatable adjustment screw inserted through an aperture in the linkage and operable to adjust the engagement between the arm and the gear assembly.

22. The cable lasher of claim 21, wherein the arm includes a pawl and wherein the gear assembly includes a gear cooperating with the pawl, the gear having sprocket grooves for receiving the pawl.

* * * * *